Nov. 10, 1970  K. L. OLIVIER ET AL  3,539,634
RECOVERY OF CATALYST IN OXO PROCESS
Filed Nov. 9, 1967  2 Sheets-Sheet 2

INVENTORS
KENNETH L. OLIVIER
LLYOD R. SNYDER
BY
ATTORNEY

United States Patent Office 3,539,634
Patented Nov. 10, 1970

3,539,634
RECOVERY OF CATALYST IN OXO PROCESS
Kenneth L. Olivier, Placentia, and Lloyd R. Snyder, Fullerton, Calif., assignors to Union Oil Company of California, Los Angeles, Calif., a corporation of California
Filed Nov. 9, 1967, Ser. No. 681,721
Int. Cl. C07c *45/08*
U.S. Cl. 260—604                                           8 Claims

ABSTRACT OF THE DISCLOSURE

The invention comprises a method for the selective removal of tars and high boiling byproducts formed during hydrocarbonylation of an olefin. In the hydrocarbonylation, the olefin is contacted with a liquid phase reaction medium containing a homogeneous catalyst comprising a complex of Group VIII metal salt or hydride and a biphyllic ligand. During the hydrocarbonylation there occurs a slight conversion to high boiling byproducts which accumulate in the distillate bottoms returned to the hydrocarbonylation zone. All or a portion of the distillation, in accordance with the invention, is passed over a solid adsorbent which is effective for the selective adsorption of the high boiling byproducts from the distillate residue. The selective adsorbent, which preferably is a silica containing solid, absorbs the tarry constituents of the distillate residue without substantial adsorption of the valuable catalyst components such as Group VIII metal or the biphyllic ligand.

DESCRIPTION OF THE INVENTION

Figure 1:
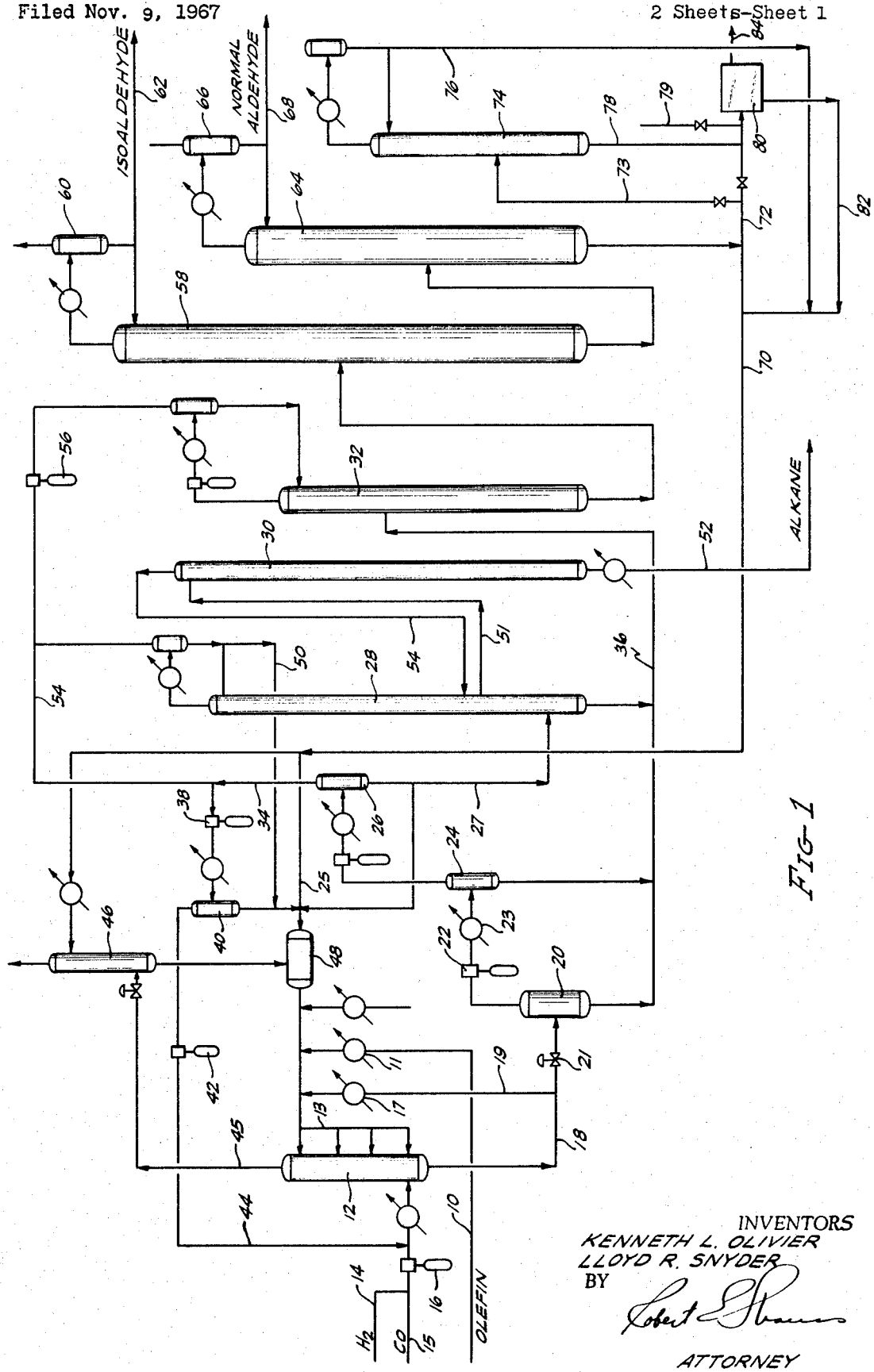

The invention relates to a method for the removal of tar and high boiling byproducts from a hydroformylation process.

In a hydroformylation process practice using a liquid phase reaction medium and a homogeneous catalyst, tarry constituents and high boiling byproducts are formed. If these are permitted to accumulate in the reaction medium they will ultimately deactivate the catalyst. The invention is particularly useful when applied to carbonylations employing a Group VIII noble metal or other precious catalyst components which can not economically be discarded but instead must be recovered and returned to the reaction. The invention is of particular value in combination with the Group VIII metal-biphyllic ligand catalyzed hydrocarbonylation process since we have found that solid adsorbents will selectively remove the high boiling and tarry constituents from the reaction media without significant removal of either the biphyllic ligand or the Group VIII metal.

The process of hydrocarbonylation wherein our invention affords the greatest value is that described in copending applications Ser. Nos. 518,562 and 642,191. The process comprises contacting the olefin, carbon monoxide and hydrogen with a liquid reaction medium containing a homogeneous catalyst at temperatures from about 20° to about 300° C. and pressures from 1 to about 1000 atmospheres. In the first of the aforementioned applications the catalyst is described as a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application aforementioned, the catalyst employed is a Group VIII noble metal hydride complex with carbon monoxide and a biphyllic ligand.

The biphyllic ligands are compounds capable of forming a complex with the catalyst by coordinate covalent bonding and have one atom with an unshared pair of electrons for such bonding. These can be organic compounds of trivalent phosphorus, antimony, arsenic and bismuth. Typically, the biphyllic ligand is an aromatic phosphine such as triphenyl phosphine.

During the hydrocarbonylation there occurs a slight but continuous accumulation of high boiling byproducts and tar fractions which remain in the bottoms from the distillation zone used to recover the products. These are recycled to the reaction zone with the bottoms stream which also contains the catalyst. In accordance with our invention all or a portion of this liquid residue fraction is passed over a solid adsorbent which is effective in selective adsorption of the high boiling byproducts and tar fractions without significant adsorption of the catalyst components. After the adsorbent has removed a sufficient quantity of the tarry components so that the selective removal of those components is diminished, the contacting with the bottoms fraction is ceased and the adsorbed tar is recovered from the solid adsorbent by washing with a solvent. The resulting solution of the desorbed tarry fractions can be further processed to several sequential adsorption steps in this manner to recover any catalyst components in the reaction media.

The solid adsorbent used for the selective adsorption of the high boiling fractions and tars which accumulate in the reaction solvent can be any inorganic solid adsorbent that is insoluble in the reaction medium and that is chemically inert to the catalyst and reaction medium. The chemical identity of the specific adsorbent used is therefore not significant provided that the solid is insoluble and inert at the adsorption conditions and possesses the specific surface area hereinafter specified. The chemical inertness and insolubility of any particular solid can readily be determined simply by contacting a sample of the solid with a sample of the liquid residue at the intended adsorption conditions and inspecting the samples after the contacting for any change in chemical structure or loss in weight of the solid.

Typical of inert solids are the oxides, hydroxides or carbonates of the metals of Groups II, III and IV of the Periodic Table, e.g., magnesium, barium, calcium, yttrium, aluminum, gallium, indium, thallium, titanium, zirconium, silicon, germanium, tin, lead, etc. The preferred adsorbents are the hydrous metal oxides i.e., the oxides of the metals of Groups II, III and IV of the Periodic Table such as silica, alumina, titania, zirconia, magnesia and barium and calcium oxides, etc. Other examples of suitable adsorbents are magnesium carbonate, barium carbonate, calcium carbonate, aluminum hydroxide, zirconium hydroxide, lead carbonate, etc. Mixtures of two or more of the aforementioned can also be employed such as physical mixtures or coprecipitated solids. The metal oxides are obtained by precipitation from a hydrous sol typically from a solution of an alkali metal salt of the amphoteric metal. Examples of such are sodium silicate, potassium aluminate, cesium titanate, lithium zirconate, etc. Precipitation is effected by heat treatment or by acidification of the solution to reduce its pH and precipitate the hydrous metal oxides. The precipitate is recovered by filtration, washed, dried and calcined generally after pelleting, grinding or forming to the desired size range.

When the adsorbent is employed in a packed reactor as illustrated, it is generally preferred to use finely divided solids having a majority of the particles passing a 20 but retained on about a 400 mesh screen. The rate of adsorption increases for the smaller particle size solids which, of course, have a higher specific surface area. The smaller particle size solids, however, exhibit a greater resistance to flow and require a greater pressure differential across the column than do coarser solids. With the aforementioned solids, pressure drops across the column can be from about 5 to 250 p.s.i., preferably from about 15 to 100 p.s.i.

The particle size used in the adsorbent treatment of our invention can be widely varied. The adsorption is a surface phenomena and particles having a large surface area are preferred. The solids having a specific surface from about 50 to about 1200 square meters per gram can be used. Preferably, solids having a specific surface from about 200 to 800 square meters per gram are used.

The contacting of the solids with the bottoms stream from the distillation zone can be performed under various liquid-solid contacting techniques. The solids can be suspended as a slurry in the liquid and separated therefrom by conventional processing such as filtration, settling, etc. The solids can also be employed as a fixed bed in a packed vessel and this is the preferred embodiment of our invention. In this embodiment the liquid is passed over the solid adsorbent which is preferably maintained in a flooded condition at liquid hourly spaced velocities from about 1 to about 100; preferably from about 5 to about 50.

When using a packed reactor it is desirable to take means to insure that the advancing front of the liquid through the bed remains perpendicular to the direction of flow. Difficulty is often experienced in obtaining homogenous packing of the reactor that will achieve uniform flow when the diameter of the reactor is disproportionately large to its length. Accordingly, we prefer to employ vessels having relatively high length to diameter ($L/D$) ratios. Such $L/D$ ratios can be from about 2 to about 100; preferably from about 3 to about 25. To minimize the $L/D$ ratio we can employ a plurality of serially connected packed adsorption vessels or position internal liquid distributors within the reactors. These liquid distributors comprise baffles transversely positioned in the reactor so as to redistribute the flow of liquid therethrough. Examples of such is the combination of a perforated tray superimposed on a liquid distribution tray such as shown in U.S. Pat. 3,218,249.

The high-boiling fraction from the product distillation zone which contains the tar byproduct and catalyst of the hydroformylation reaction is passed over the solid adsorbent with an eluting solvent which can be any liquid having a solvency for the catalyst components and the high-boiling byproducts of the hydroformylation reaction and having a solvent strength no greater than that of benzene. Examples of suitable solvents are illustrated hereinafter in the description of suitable reaction solvents. Preferably, as hereafter described, this solvent is also the reaction solvent so that replacement of the reaction solvent is not necessary for conducting the adsorption step.

When reaction solvents having solvent strengths greater than that of benzene are used, the high-boiling bottoms from the distillation column can be treated to replace substantially all of the reaction solvent with the desired eluting solvent for the adsorption step. This replacement can be achieved simply by employing an eluting solvent having a boiling point greater than the reaction solvent and using as the combined reaction solvent a mixture of the low-boiling, high solvent strength solvent with a minor proportion of the higher boiling eluting solvent.

In the treatment of the residue from the product distillation zone, the residue is passed to an evaporator where the lower boiling reaction solvent is removed to concentrate the catalyst component and tar byproducts in the low solvent strength, high-boiling solvent and the concentrated stream is then passed over the adsorption solid for selective removal of the tarry byproducts. The purified stream containing the catalyst components can then be added directly back to the reaction zone.

After the solid has adsorbed up to its capacity of the high boiling tar byproducts and thereby has become greatly reduced in effectiveness, contacting with the tar containing stream is discontinued and the solid is regenerated.

Regeneration is accomplished by desorbing the tar from the solid. This is accomplished by contacting the solid with a solvent which is adsorbed more strongly than the tar. This contacting results in displacement of the tar from the adsorbent. Preferably, the initially displaced fluid which comprises about 0.5 to 2.0 of the pore volume of the solid adsorbent is returned to the hydroformylation zone since this initially displaced fluid is the liquid that was occluded in the interstices and pores of the solid and is substantially unaltered in composition from the original charge to the adsorption zone.

The displacement of the tar from the solid can be effected by any liquid having greater solvent strength than that of benzene. Water can be used alone or in combination with organic liquids having the sufficient solvent strength. Organic liquids that can be used include alkyl and aryl aldehydes, ketones and alcohols, low molecular weight amides and acyloxy halides such as formamide and acetamide, acetyl chloride, benzoyl chloride, nitrobenzene, etc.

The solvent strength of any solvent used can be determined experimentally or calculated from the chemical structure of the solvent. Since the solvent strengths are approximately inversely proportional to the interfacial tension between the solvent and water, this parameter can also be used as an approximation of the solvent strength. Thus, a solvent having an interfacial tension with respect to water that is greater than that of benzene (35 dynes per centimeter at 20° C.) can be used as the eluting solvent while a solvent having an interfacial tension with respect to water less than that of benzene can be used as the desorbing solvent.

The following table lists an elutropic series of solvents in an order of increasing solvent strengths measured on an alumina adsorbent. The surface tensions with respect to water of some of these solvents are also presented:

TABLE 1

| Solvent | $\epsilon°$ | Interfacial tension to water, dynes/cm. |
|---|---|---|
| Fluoroalkanes | −.25 | |
| n-Pentane | 0.00 | |
| Isooctane | 0.01 | |
| Petroleum ether, Skellysolve B, etc | 0.01 | 48.51 |
| n-Decane | 0.04 | |
| Cyclohexane | 0.04 | |
| Cyclopentane | 0.05 | |
| Diisobutylene | 0.06 | |
| 1-pentene | 0.08 | |
| Carbon disulfide | 0.15 | 48.36 |
| Carbon tetrachloride | 0.18 | 45.0 |
| Amyl chloride | 0.26 | |
| Xylene | 0.26 | 37.7 |
| Isopropyl ether | 0.28 | |
| i-Propyl chloride | 0.29 | |
| Toluene | 0.29 | 36.1 |
| n-Propyl chloride | 0.30 | |
| Chlorobenzene | 0.30 | 37.4 |
| Benzene | 0.32 | 35.0 |
| Ethyl bromide | 0.37 | 31.2 |
| Ethyl ether | 0.38 | 10.7 |
| Ethyl sulfide | 0.38 | |
| Chloroform | 0.40 | 27.7 |
| Methylene chloride | 0.42 | 28.3 |
| Methyl-i-butylketone | 0.43 | |
| Tetrahydrofurane | 0.45 | |
| Ethylene dichloride | 0.49 | |
| Methylethylketone | 0.51 | |
| 1-nitropropane | 0.53 | |
| Acetone | 0.56 | 0 |
| Dioxane | 0.56 | |
| Ethyl acetate | 0.58 | |
| Methyl acetate | 0.60 | |
| Amyl alcohol | 0.61 | 5.0 |
| Dimethyl sulfoxide | 0.62 | |
| Aniline | 0.62 | 5.77 |
| Diethyl amino | 0.63 | |
| Nitromethane | 0.64 | 9.66 |
| Acetonitrile | 0.65 | |
| Pyridine | 0.71 | |
| Butyl cellusolve | 0.74 | |
| Isopropanol, n-propanol | 0.82 | 0 |
| Ethanol | 0.88 | 0 |
| Methanol | 0.95 | 0 |
| Ethylene glycol | 1.11 | |
| Acetic acid | Large | |

The solvent strength of any organic liquid not presented in the preceding table can be determined by mathematically comparing the results obtained when a solution of an adsorbing sample in the organic liquid and a solution of the adsorbing sample in any of the above-listed solvents are passed over an alumina adsorbent. The results are substituted into the following equation which can then be solved for the value of $\epsilon_L$ of the organic liquid:

$$\log\left(\frac{K_L}{K_1}\right) = \alpha A_s(\epsilon_L - \epsilon_1)$$

wherein:

K=ration of sample (s) concentration (milliliters per gram) in adsorbent/unadsorbed phases for liquid ($K_L$) and solvent ($K_1$)
$\alpha$=adsorbed surface activity function
$A_s$=adsorbed sample molecular area, in units of 8.5 square angstroms
S=solvent strength, in reciprocal units of $A_s$ The preceding table lists the solvent strengths of the solvents on alumina. The same order of this elutropic series applies to other adsorbents, however, the absolute value of $\epsilon$ will vary with the adsorbent. This variation of the absolute value does not affect the selection of any particular solvent since, as specified herein, such selection is made on a relative basis, i.e., the solvent strength with regard to benzene. To illustrate the applicability of the series to another adsorbent, a comparison of solvent strengths of several solvents on several adsorbents is presented in Table 2:

TABLE 2

| Solvent | Solvent strength, $\epsilon°$ | | | |
|---|---|---|---|---|
| | SiO₂ | Florisil | MgO | Al₂O₃ |
| Pentane | 0.00 | 0.00 | 0.00 | 0.00 |
| Cyclopentane | | | 0.03 | 0.05 |
| CCl₄ | 0.11 | 0.04 | 0.10 | 0.18 |
| Benzene | 0.25 | 0.17 | 0.22 | 0.32 |
| Ethyl ether | 0.38 | 0.30 | 0.21 | 0.38–0.46 |
| Chloroform | 0.26 | 0.19 | 0.26 | 0.40 |
| Methylene chloride | 0.32 | 0.23 | 0.26 | 0.42 |
| Ethyl acetate | 0.38 | | | 0.58 |
| Methyl acetate | | | 0.28 | 0.60 |
| Acetone | 0.47 | | | 0.56 |
| Dioxane | 0.49 | | | 0.56 |
| Acetonitrile | 0.50 | | | 0.65 |

The ethylenically unsaturated compound carbonylated in accordance with our invention can comprise any olefin having from 2 to about 25 carbons; preferably from 2 to about 18 carbons. This olefin has the following structure:

$$R_2R_1C=CR_3R_4$$

wherein $R_1$, $R_2$, $R_3$ and $R_4$ are hydrogen, alkyl, cycloalkyl, aryl, alkaryl, aralkyl, hydroxyalkyl, hydroxyaryl, aminoalkyl or aminoaryl or wherein one of said $R_1$ and $R_2$ and one of said $R_3$ and $R_4$ together form a single alkylene group having from 2 to about 8 carbons.

Examples of useful olefins are the hydrocarbon olefins such as ethylene, propylene, butene-1, butene-2, 2-methylbutene-1, cyclobutene, hexene-1, hexene-2, cyclohexene, 3-ethylhexene-1, isobutylene, octene-1, 2-propylhexene-1 ethylcyclohexene, decene-1, cycloheptene, cyclooctene, cyclononene, 3,4′-dimethylnonene-1, dodecene-1, undecene-3, 6-propyldecene-1, tetradecene-2, 7-amyldecene-1, oligomers of olefins such as propylene tetramer, ethylene trimer, etc., hexadecene-1, 4-ethyltridecene-1, octadecene-1,5, 5-dipropyldodecene-1, vinylcyclohexane, allylcyclohexene, styrene, p-methylstyrene, alpha-methylstyrene, p-vinylcumene, beta-vinylnaphthalene, 1,1-diphenylethylene, allylbenzene, 6-phenylhexene-1, 1,3-diphenylbutene-1, 3-benzylheptene-1, o-vinyl-p-xylene, m-aminostyrene, divinylbenzene, 1-allyl-4-vinylbenzene, allylamine, p-aminostyrene, allylaniline, crotonyl alcohol, allylcarbinol, beta-allylethanol, allylphenol, etc. Of the preceding the alpha olefins and olefins having 2 to about 8 carbons are preferred classes.

The reaction is performed under liquid phase conditions and, when the olefin comprises a liquid at the reaction conditions, the olefin can be used in excess to provide the liquid reaction medium. If desired, however, any suitable organic liquid can be employed as a reaction solvent; preferably, organic solvents which are inert to the reaction conditions, the reactants, the catalyst and the products are employed. Examples of suitable solvents which can be used in accordance with our invention include hydrocarbons such as the aromatic aliphatic or alicyclic hydrocarbons, ethers, esters, ketones, etc.

Examples of suitable hydrocarbons that can be employed in the solvents include aromatic hydrocarbons such as benzene, toluene, xylene, ethylbenzene, tetralin, etc,; aliphatic hydrocarbons such as butane, pentane, isopentane, hexane, isohexane, heptane, octane, isooctane, naphtha, gasoline, kerosene, mineral oil, etc.; alcyclic hydrocarbons, e.g., cyclopentane, cyclohexane, methylclopentane, decalin, indane, etc.

Various alkyl and aryl ketones can also be employed as the recation solvent, e.g., acetane, methylethyl ketone, diethyl ketone, diisopropyl ketone, ethyl-n-butyl ketone, methyl-n-amyl ketone, cyclohexanone, diisobutyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl either, etc.

Various esters can also be employed as the solvent, e.g., ethyl formate, methyl acetate, ethyl ac tate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl maleate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc. A preferred class of ester solvents includes the lactones, e.g., butyrolactone, valerolactone and their derivatives having lower ($C_1$–$C_5$) alkyl substituents.

Alcohols can also be employed as a reaction solvent. Preferably tertiary alcohols are employed since these materials are substantially non-reactive under the reaction conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent that, if desired, the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

Also useful as solvents for the reaction are the aldehyde products of the carbonylation. These products are surprisingly inert and resist aldol condensation and hydrogenation under the hydroformylation conditions. Accordingly, aldehydes such as propionaldehyde, butyraldehyde, valeric, hexanoic, heptenoic, caproic, decanoic aldehydes, etc., can be employed as the reaction medium.

The catalyst comprises a Group VIII metal hydride or salt, typically a halide, in complex association with carbon monoxide and a biphyllic ligand. There can also be incorporated in the catalyst a polycyclic, heterocyclic amine having a nitrogen in at least one bridgehead position. Examples of suitable Group VIII metal hydrides, carbonyls or salts useful in forming the catalyst are those which are commercially available and can be purchased and used directly. Examples of suitable sources of noble metal catalysts are as follows:

Bis(triphenylphosphine)iridium carbonyl chloride; tris(triphenylphosphine)iridium carbonyl hydride; iridium carbonyl; iridium tetrabromide; iridium tribromide; iridium trifluoride; iridium trichloride; osmium trichloride; chloroosmic acid; palladium hydride; palladous chloride; palladous cyanide; palladous iodide; palladous nitrate; platinic acid; platinous iodide; palladium cyanide; sodium hexachloroplatinate; potassium trichloro(ethylene)platinate(II); chloropentaaminorhodium(III) chloride; rhodium carbonyl chloride dimer; rhodium nitrate; rhodium trichloride; tris(triphenylphosphine)rhodium carbonyl hydide; tris(triphenylphosphine)rhodium(I)chloride; ruthenium trichloride; tetraaminorutheniumhydroxychloro chloride, etc.

Suitable salts of other Group VIII metals include cobalt chloride, ferric acetate, nickel fluoride, cobalt nitrate; etc., carboxylates of $C_2$–$C_{10}$ acids, e.g., cobalt acetate, cobalt octoate, etc. nickel sulfate, ferric nitrate, etc.

The catalyst also comprises a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismouth in a trivalent state. Of these the phosphorus compounds, i.e., the phosphines, are preferred; however, the arsines, stibines and bismuthines can also be employed. In general these biphyllic ligands have the following formula:

$$E(R)_3$$

or the following formula:

$$(R)_2ER'E(R)_2$$

wherein E is a trivalent atom selected from the class consisting of phosphorus, arsenic, antimony and bismuth;
wherein R is a member of the class consisting of hydrogen, alkyl from 1 to 8 carbon atoms, aryl from 6 to 8 carbons and amino, halo and alkoxy substitution products thereof; and
wherein R' is alkylene having from 1 to about 8 carbons.

Examples of suitable biphyllic ligands useful in my invention to stabilize the catalyst composition are the following: trimethylphosphine, triethylarsine, triethylbismuthine, triisopropylstibine, chlorodiethylphosphine, triaminobutylarsine, ethyldiisopropylstibine, tricyclohexylphosphine, triphenylphosphine, triphenylbismuthine, tri(o-tolyl)phosphine, tris(2-ethylhexyl)arsine, phenyldiisopropylphosphine, phenyldiamylphosphine, ethyldiphenylphosphine, chlorodixylylphosphine, chlorodiphenylphosphine, tris(diethylaminomethyl)phosphine, ethylene bis(diphenylphosphine), tritolylphosphine, tritolylstibine, hexamethylene bis(diisopropylarsine), pentamethylene bis(diethylstibine), diphenyl(N,N-dimethylanilinyl)phosphine, trianilinylphosphine, tri(3,5-diaminophenyl)phosphine, trianilinylarsine, anilinyldiphenylbismuthine, etc. Of the aforementoned, the arylphosphines are preferred because of the demonstrated non-equivalent greater activity of catalysts comprising the arlylphosphines.

The cocatalyst employed with the Group VIII noble metal halide catalyst is a poly(heterocyclic)amine having at least one nitrogen in a bridgehead position. The term "bridgehead position" is well established in chemical nomenclature to identify the position of an atom which is common to at least two of the rings of the polycyclic compound. Preferably the amine is an atom-birdged system, i.e., atoms, generally methylene carbons, form the bridge or link in the molecule rather than a simple valence bonding. The amine is also used in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons; preferably from 2 to about 10 carbons; can be employed for this purpose and the following is a listing of representative amines useful in my invention:

1,2,4-triazabicyclo(1.1.1)pentane;
1,5,6-triazabicyclo(2.1.1)hexane;
5-oxa-1,6-diazabicyclo(2.1.1)hexane;
5-thia-1,6-diazabicyclo(2.1.1)hexane;
2-oxa-1,5,6-triazabicyclo(2.1.1)hexane;
1,2,5,6-tetrazabicyclo(2.1.1)hexane;
5-oxa-1,2,3,6-tetrazabicyclo(2.1.1)hexane;
1-azabicyclo(3.3.1)heptane;
1-azabicyclo(2.2.1)heptane;
1,4-methano-1,1-pyrindine;
2-oxa-1-azabicyclo(2.2.1)heptane;
1,4-diazabicyclo(2.2.1)heptane;
7-oxa-1-azabicyclo(2.2.1)heptane;
7-thia-1-azabicyclo(2.2.1)heptane;
1,7-diazabicyclo(2.2.1)heptane;
1,3,5-triazabicyclo(2.2.1)heptane;
1-azabicyclo(3.2.1)octane;
1,5-diazatricyclo(4.2.1)decane;
1.7-diazatricyclo(3.3.1.2)undecane;
7-ox-1-azabicyclo(3.2.1)octane;
1,7-diazabicyclo(3.2.1)octane;
3-thia-1,7-diazabicyclo(3.2.1)octane;
1,3,6,8-tetrazatricyclo(6.2.1)dodecane;
2,8-diazatricyclo(7.3.1.1)tetradecane;
1-azabicyclo(3.3.1)nonene,
also known as 1-isogranatinine and the oxo, hydroxy and lower alkyl derivatives thereof; 1-azabicyclo(2.2.2)octane also known as quinuclidine as well as the halo, oxo, hydroxy and lower alkyl derivatives thereof;
1-azatricyclo(3.3.1.1)decane;
1,3-diazabicyclo(2.2.2)octane;
1,3-diazabicyclo(3.3.1)nonene;
1,6-diazatricyclo(5.3.1)dodecane;
2-ox-1-azabicyclo(2.2.2)octane;
4,6,10-triox-1-azatricyclo(3.3.1.1)decane;
1,5-diazabicyclo(3.3.1)nonene;
1,2,5,8-tetrazatricyclo(5.3.1.1)dodecane;
1,4-diazabicyclo(2.2.2)octane also known as triethylene diamine and its oxo, hydroxy, halo and lower alkyl derivatives thereof; 1,3-diazatricyclo(3.3.1.1)decane also known as 1,3-diazaadamantane; 1,3,5-triazatricyclo(3.3.1.1)decane; 1,3,5,7-tetrazabicyclo(3.3.1)nonene also known as pentamethylene tetramine; 1,3,5,7-tetrazatricyclo(3.3.1.1)decane also known as hexamethylene tetramine; 2-oxa,1,3,4-triazabicyclo(3.3.1)nonene; 1-azabicyclo (4.3.1)decane; 1-azabicyclo(3.2.2)nonene; 1,5-diazabicyclo(3.2.2) nonene; 1,3,5,7-tetrazabicyclo(3.3.2)decane; 1,5-diazabicyclo (3.3.3)undecane; etc.

Of the aforemntioned poly(heterocyclic)amines having a nitrogen in a bridgehead position the most common and widely known compound is 1,4-diazabicyclo(2.2.2)octane (triethylene diamine) and this material as well as its oxo, hydroxy, halo and lower alkyl derivatives comprises the preferred cocatalyst for use in our process.

The process can be conducted batchwise or in a continuous fashion. The continuous fashion will be illustrated by reference to the figures of which FIG. 1 illustrates the reaction and product recovery facilities and FIG. 2 illustrates the treatment of the high boiling residue for the removal of tarry and high boiling byproducts therefrom.

Figure 2:
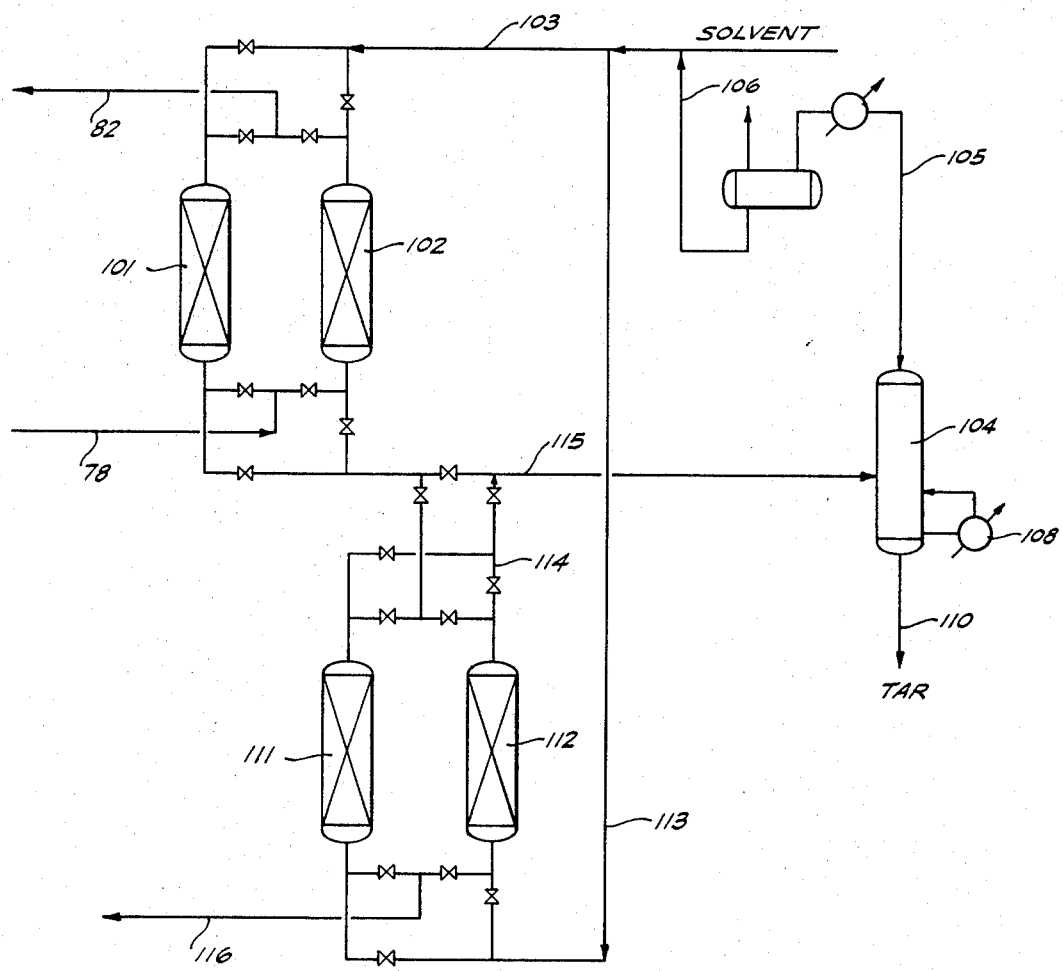

Referring now to FIG. 1, the olefin is introduced through line 10 and is preheated in heat exchanger 11 and introduced into the reaction zone 12 through manifold 13. Also introduced into the reaction zone are hydrogen supplied through line 14 and carbon monoxide supplied through line 15. A compression 16 is provided to compress these reactants to the desired reaction pressure, e.g., from 500 to about 5000 p.s.i.g., preferably from about 500 to about 1500 p.s.i.g. These reactants are introduced into reaction zone 12 beneath the liquid phase therein and together with the olefin constitute the reactant feed to the reactor.

In the reactor countercurrent contacting can be effected by passing the liquid introduced through the manifold 13 downwardly countercurrent to the rising gas stream. The liquid is withdrawn from the bottom of the reactor through line 18 and is passed to gas separation zone 20 while recycled liquid is recycled through line 19 and cooler 17 for maintaining the desired reaction temperature of about 50° to about 200° C., generally from about 70° to about 180° C.

The liquid withdrawn through line 18 and introduced into separator 20 is reduced in pressure by passage through valve 21 and the vapor overhead from zone 20 is compressed with compressor 22, cooled in cooler 23 and passed to a separator 24 for removal of condensate aldehyde product. The vapor from zone 24 comprising unreacted olefin and some alkane resulting from hydrogenation in the reactor is compressed in a second campressor, cooled and passed to another separator 26 where the olefin is condensed and returned to the process through line 25. The vapors from separator 26 are passed through line 34, blended with additional quantities of vapor from the fractionator 32, passed through line 36, compressed with compressor 38, cooled and further separation between condensed olefin and recycle vapor is effected in drum 40. The vapor withdrawn from 40 is compressed in recycle compressor 42 and returned to the process through line 44.

The vapor effluent from the reaction zone removed through line 45 is passed into an adsorber, column 46, where the vapor is contacted with a countercurrent, downwardly descending stream of solvent for the adsorption of unreacted olefin. This unreacted olefin is passed into olefin accumulator 48 from which it is returned to the reaction zone for further contacting. The condensed olefin from accumulator 40 and separator 26 is added to this recycle olefin.

Fractionator 28 and stripping column 30 are provided to prevent accumulation of the alkane byproduct formed by hydrogenation in the process. Unless removed, the alkane would accumulate in the recycle olefin reactant. The two columns are provided for effecting a separation between the olefin and the saturated alkane thereof. This is achieved by passing a slipstream comprising from 5 to 95 percent of the condensed olefin from drum 26 through line 27 into tower 28. The olefin is removed from the overhead of this tower, is condensed and returned through line 50 to the olefin accumulator 48. A sidestream is removed through line 51 and passed to stripping column 30 where the alkane is removed as the bottoms fraction through line 52. The stripped vapors are returned through line 54 to the tower 28. The aldehyde product that is included in the condensed liquid of the slipstream in line 27 is removed from tower 28 as a bottoms fraction and is combined with the condensates of drums 20 and 24 and passed to stabilizer 32 where the traces of lower boiling olefins are removd oeverhead, compressed with compressor 56 and returned through line 54 to the feed accumulator 48. The stabilizer bottoms are then passed to product fractionator 58 and the isoaldehyde product is removed overhead, cooled and condensed and separated in drum 60 and removed through line 62. The normal acetaldehyde, higher boiling than the iso, is removed in the bottoms stream from fractionator 58 and passed to a second distillation tower 64. The normal aldehyde is removed as a vapor, cooled, condensed and separated from the gas in drum 66 and removed as a product through line 68.

The bulk of the distillate bottoms in 64 which comprises the reaction solvent, catalyst and accumulated high boiling byproducts is removed and returned through line 70 to the process. A slipstream amounting to from about 1 to about 25 percent of the bottoms from this distillation tower 64 is removed through line 72.

In the preferred embodiment, the reaction solvent has a solvent strength no greater than benzene and the stream 72 can be passed directly to tar removal zone 80 and processes as hereinafter described with reference to FIG. 2.

When the solvent has a solvent strength greater than benzene, the stream 72 can be diverted through line 73 to solvent recovery tower 74. In this tower the bottoms are flashed to remove the lower boiling solvent as a vapor which is condensed and returned to the process through line 76. The high boiling fraction from the tower containing a concentrated solution of catalyst and high boiling byproducts in the solvent is removed through line 78. Any of the aforementioned solvents having solvent strengths no greater than that of benzene can be added to the tar and catalyst through line 79 to provide a liquid stream which can be handled in zone 80. This tar and catalyst containing stream is then passed to the selective adsorbent treatment of our invention represented by block 80. The recovered components of the stream including catalyst and solvent are returned to the process through line 82 and the high boiling byproducts are discarded through line 84.

FIG. 2 shows the treatment facilities represented generally at 80 in FIG. 1. These treatment facilities comprise one or more of packed reactors 101 and 102. These are preferably connected in parallel and are manifolded and valved to permit simultaneous adsorption and regeneration of alternate adsorbent beds. In this manner the stream of 78 of FIG. 1 which comprises a concentrated high boiling fraction containing from about 1 to about 25 volume percent of tarry and hgih boiling byproducts in the reaction solvent is passed through adsorbent bed 101. During passage over the solid adsorbent the high boiling fractions and tars are adsorbed on the solid and the solvent continues through the bed carrying with it the catalyst components. The zone 101 is packed with a suitable adsorbent, typically silica gel. The liquid is passed through this bed at a liquid hourly space velocity between about 1 and about 100 volumes per volume of solid per hour.

After the bed has been used for a sufficient time that its adsorption capacity is reduced, generally after the bed has adsorbed from about 10 to about 100 weight percent, it is removed from service and regenerated for reuse. This is achieved by diverting the flow to zone 102 and then regenerating the adsorbent in 101. The adsorbent is regenerated by passing a solvent introduced through line 103 through the adsorbent bed at a rate from about 1 to about 100 liquid volumes per volume per hour and for a sufficient period of time to displace the high boiling products accumulated on the adsorbent. In general, washing with a total of about 1 to about 10 volumes of solvent per volume of adsorbent is sufficient to wash the majority of the high boiling products from this adsorbent. In effecting the displacement of tar, the initial washing is returned to the reaction zone since it comprises reaction medium residue that filled the pore volumes of the adsorbent. The solid adsorbents have pore volumes of from 0.5 to about 1.0 cubic centimeters per gram so that the initially displaced liquid comprising from 0.5 to 2.0 times the adsorbent pore volume is returned to the reaction zone to avoid excessive loss of the catalyst. The washings from this treatment can then be passed to a tower 104 where the solvent is vaporized and removed through line 105 and returned to the process through line 106. A reboiler 108 is used to furnish heat for the vaporization. The high boiling tar fractions are removed through line 110.

The solvent washings from regeneration of the adsorbents in zones 101 or 102 can be further processed to recover any additional amounts of the catalyst that may have also been adsorbed on the solid adsorbents in the zone. This can be effected by passing the solvent containing the washings from the zones through a second bed of solid adsorbents in zones 111 and 112. These zones are also in parallel with manifolding and valving to permit simultaneous adsorption and regeneration. In a typical illustration the washings are passed through the bed in zone 111 while solvent supplied through line 113 is passed through the bed in 112 to remove its adsorbed tar fractions. The desorbed tar and solvent are passed through line 114 to line 115 and from there to the separation zone 104. The solvent containing the recovered catalyst is removed through line 116 and the catalyst is removed from this stream by further processing such as distillation, extraction. etc. Other catalyst recoveries include burning the tar and residual catalyst and recovering the metal as the oxide from the resulting ash.

The solids employed as the selective adsorbent generally have a specific surface from about 50 to 1000 square meters per gram, preferably from about 200 to 800 square meters per gram.

The solvents employed for regeneration of the solid adsorbents can in general be any oxygenated solvent such as esters, ketones, aldehydes and alcohols. A very desirable solvent comprises the aldehyde product of the process since this reduces the amount of contamination which can occur in the process and eliminates the need to displace the solvent from the solid adsorbent prior to returning the solid adsorbent into service for further adsorption. In this manner the initial recycle in line 82 comprises the displaced solvent which is returned to the process for further contacting.

We have discovered that selective adsorbents for the high boiling byproducts also effect removal of the inactive or oxygenated form of the biphyllic ligand cocatalyst. As previously mentioned, this material is a compound having an atom with an unshared pair of electrons. This unshared electron pair can comprise a site for oxidation and these ligands will readily oxidize and form a less effective oxide derivative. It is desirable to remove this oxide and avoid its accumulation in the process because of the ultimate deactivation of the catalyst. We have found that the oxide is also selectively adsorbed by the adsorbent and removed from the recycle liquid returned through line 82. Thus the use of the solid adsorbents not only selectively eliminates the high boiling and tarry components of the recycle liquid but also removes the deactivated biphyllic ligand oxide from the process.

The invention will now be described by reference to examples which are intended to illustrate the invention and to demonstrate results obtainable thereby.

EXAMPLE 1

A hydroformylation process was performed in a continuous reactor operated at 500 p.s.i.g. and 95° C. by charging propylene, carbon monoxide and hydrogen to the reactor containing a toluene solution of a rhodium hydride carbonyl triphenylphosphine, triethylenediamine catalyst. The liquid was recycled through the reaction zone for a reaction period of 65 hours. The liquid reaction medium upon completion of the 65 hour reaction period was distilled in a laboratory column to remove solvent from the reaction solvent and to concentrate the residue. The residue was added to toluene to provide a 10 weight percent solution and then passed through a column 6 millimeters in diameter and 40 centimeters in length, packed with 3.9 grams of Davison Grade 12 silica gel that had been previously calcined at 200° C. The solid had a specific surface area of 800 square meters per gram, a pore volume of 0.43 cubic centimeter per gram and a particle size passing a 200 mesh screen. The solution was passed through the column until a total of 160 milliliters had been contacted and at that time the flow was discontinued and the column was regenerated by washing in the reverse direction with butyraldehyde. A total of 20 milliliters of butyraldehyde was passed through the column and the washings were collected and distilled to recover the butyraldehyde therefrom. The washing with butyraldehyde was followed by a washing with 20 milliliters of methanol and the methanol washings were collected and distilled to recover the solvent therefrom. The washings contained the following materials:

|  | Tar, grams | Rhodium, milligrams |
|---|---|---|
| Washings: | | |
| Butyraldehyde | 2.59 | 0.09 |
| Methanol | 0.36 | 0.08 |

The total of the adsorbed tar and heavy ends was 2.95 grams and the total of adsorbed rhodium catalyst was 0.17 milligram. The capacity of the adsorbent for the tar fraction comprises 67 weight percent and the tar removed was 18.4 percent of the total tar passed through the column. The total rhodium adsorbed was 2. weight percent of the rhodium contained in the solvent passed through the column thereby indicating a high separation factor between these components of the fraction passed over the solid adsorbent.

Substantially the same results are obtained when equal weights of alumina, barium carbonate or zirconia are substituted in the adsorption column for the silica gel adsorbent used in the preceding example.

EXAMPLE 2

The adsorption was repeated using a residue from a hydroformylation catalyzed with rhodium halide carbonyl triphenylphosphine and triethylenediamine. Fifty milliliters of a solution containing 6 weight percent of tar and heavy fractions was passed over Davison Grade 62 silica gel in the aforementioned column. The solid had a specific surface of 340 square meters per gram, a pore volume of 1.15 cubic centimeters per gram and a particle size passing a 60 mesh but retained on a 200 mesh screen. The column was then desorbed by passing, in a reverse direction, 20 milliliters of butyraldehyde solvent followed by 20 milliliters of methanol. The following tables summarizes the results of this washing:

|  | Heavy ends, grams | Rhodium, milligrams |
|---|---|---|
| Washing: | | |
| Butyraldehyde | 0.166 | 0.21 |
| Methanol | 0.025 | 0.076 |

The total of heavy ends recovered from the solvent comprise 0.371 gram and the total rhodium was 0.29 milligram. The capacity of the adsorbent for the high boiling fraction was 16 weight percent, and 12.3 percent of the tar in the solvent was removed by the contact. The amount of rhodium removed by the contacting was 1.27 weight percent of the total rhodium the high boiling fraction. The triphenylphosphine in the solution passed through the column without any detectible adsorption. When the column of adsorbent is contacted with a residue from a hydroformylation catalyzed with a rhodium complex and triphenylphosphine and containing some triphenylphosphine oxide, the oxide is adsorbed and the effluent from the contacting contains substantially no triphenylphosphine oxide and substantially all the triphenylphosphine in the residue charge.

EXAMPLE 3

A cobalt hydroformylation catalyst was prepared by charging 7 grams dicobalt octacarbonyl, 20 milliliters tri(n-butyl)phosphine and 50 milliliters pentane to an autoclave. The clave was closed, pressured to 300 p.s.i.g.

with hydrogen and then 300 p.s.i. of carbon monoxide was added. The autoclave contents were heated to and maintained at 150° C. for one hour. The autoclave was then cooled, depressured, opened and the liquid contents filtered to recover the catalyst.

A solution containing, in toluene, the aforementioned catalyst at a concentration of about 250 milligrams cobalt per liter and about 10 weight percent of a typical tarry byproduct from a hydroformylation was treated in accordance with our invention. The treatment was performed by passing 50 milliliters of the solution over a column containing 4 grams silica. The column was washed with 10 milliliters of toluene and then washed with 10 milliliters each of butyraldehyde and methanol in successive washings. The treated solution and all washings were analyzed for tar and cobalt contents and the following results were obtained:

| | Volume, ml. | Cobalt, percent recovered | Tar, percent recovered |
|---|---|---|---|
| Treatment: | | | |
| Feed | 50 | 89.1 | 75 |
| Toluene | 10 | 7.8 | 6.2 |
| Butyraldehyde | 10 | 2.3 | 8.9 |
| Methanol | 10 | 0.8 | 9.9 |

In practice, the toluene washing would be recycled to the reactor. The additive removal of tar and cobalt in the butyraldehye and methanol washings was 18.8 and 3.1 percent, respectively, demonstrating the selectivity of the solid for removal of the tar fraction.

The preceding examples are intended solely to illustrate the mode of practice contemplated for practicing our invention and to illustrate the results obtainable thereby. It is not intended that the axamples be unduly limiting of the invention which is defined by the reagents, adsorbents, and method steps, and their obvious equivalents, set forth in the following claims:

We claim:

1. In the hydroformylation of hydrocarbon olefins having from 2 to about 25 carbons to alcohols and aldehydes wherein the olefin, carbon monoxide and hydrogen are contacted with a liquid reaction medium containing a catalyst of a Group VIII metal and a biphyllic ligand selected from the class consisting of hydrocarbyl phosphines, arsines, stibines and bismuthines and wherein the hydroformylation products are vaporized and recovered from reaction medium containing said catalyst by distillation and the unvaporized reaction medium residue from the distillation is returned to further contacting with said olefin, carbon monoxide and hydrogen and wherein high boiling byproducts are formed and accumulate in said reaction medium residue, the improved method that comprises: removing the high boiling byproducts from said reaction medium residue at a temperature from 10° to about 200° C. and a pressure from about 1 to 250 atmospheres, by passing at least about one percent of said reaction medium residue after removal of said products and in admixture with an eluting solvent having a solvent strength no greater than benzene at a space velocity from about 5 to 50 liquid volumes per volume per hour, through a column of an inorganic solid adsorbent that, at said temperature and pressure, is insoluble in the reaction medium and is chemically inert to said catalyst and reaction medium and that has a specific surface area of from 50 to 1200 square meters per gram, removing from said contacting a purified reaction medium residue having a reduced content of high boiling byproducts and oxidized ligand and returning said purified reaction medium residue containing substantially all of the Group VIII metal catalyst present in said residue prior to said contacting to said contacting with said olefin, carbon monoxide and hydrogen.

2. The hydroformylation of claim 1 wherein said catalyst is a complex of a Group VIII noble metal and a triarylphosphine.

3. The hydroformylation of claim 1 wherein said catalyst is a complex of a Group VIII metal and a trialkylphosphine.

4. The hydroformylation of claim 1 wherein said solid adsorbent is silica.

5. The hydrofarmylation of claim 1 wherein said solid adsorbent has a specific surface area from 200 to about 800 square meters per gram.

6. The method of claim 1 wherein said contacting of said residue and said solid adsorbent is performed by passing said residue through a vessel packed with fixed bed of said solids.

7. The method of claim 1 wherein said contacting is continued until the said solid has adsorbed from 10 to 100 percent of its weight in high boiling byproducts and has become substantially reduced in adsorption capacity and thereafter said contacting is discontinued and said solid is regenerated by contacting said solid with from 1 to about 10 volumes per volume of solid of an organic solvent having a solvent strength greater than benzene.

8. The method of claim 7 wherein the liquid initially displaced from the pores of said solid in said regeneration is returned to further contacting with said olefin, carbon monoxide and hydrogen.

References Cited

UNITED STATES PATENTS

| | | |
|---|---|---|
| 2,648,694 | 8/1953 | Mason. |
| 2,594,341 | 4/1952 | Owen et al. |
| 2,965,680 | 12/1960 | Andersen et al. |
| 2,824,898 | 2/1958 | Watts. |

FOREIGN PATENTS

| | | |
|---|---|---|
| 1,045,679 | 10/1966 | Great Britain. |

LEON ZITVER, Primary Examiner

R. H. LILES, Assistant Examiner

U.S. Cl. X.R.

260—578, 584, 599, 600, 602, 617, 618, 621, 698,